(12) United States Patent
Schumann et al.

(10) Patent No.: US 8,095,405 B1
(45) Date of Patent: *Jan. 10, 2012

(54) FREIGHT AND LOGISTICS HIGH PERFORMANCE CAPABILITY ASSESSMENT

(75) Inventors: Klaus Schumann, Wehrheim (DE); Katja Price, Maintal (DE)

(73) Assignee: Accenture Global Services Limited, Dublin (IE)

( * ) Notice: Subject to any disclaimer, the term of this patent is extended or adjusted under 35 U.S.C. 154(b) by 443 days.

This patent is subject to a terminal disclaimer.

(21) Appl. No.: 12/471,767

(22) Filed: May 26, 2009

(51) Int. Cl.
G06Q 99/00 (2006.01)
(52) U.S. Cl. .................. 705/7.11; 705/7.29; 705/7.31
(58) Field of Classification Search ............. 705/7.11, 705/7.29, 7.31
See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2002/0035495 A1* | 3/2002 | Spira et al. | 705/7 |
| 2003/0083912 A1* | 5/2003 | Covington et al. | 705/7 |
| 2003/0110067 A1 | 6/2003 | Miller et al. | |
| 2004/0098299 A1* | 5/2004 | Ligon et al. | 705/10 |
| 2008/0040144 A1* | 2/2008 | Riggs et al. | 705/1 |
| 2009/0125350 A1* | 5/2009 | Lessing et al. | 705/7 |

FOREIGN PATENT DOCUMENTS
DE 102008004655 A1 * 6/2009

OTHER PUBLICATIONS

U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.

(Continued)

*Primary Examiner* — Akiba Robinson Boyce
(74) *Attorney, Agent, or Firm* — Brinks Hofer Gilson & Lione

(57) ABSTRACT

A high-performance capability assessment model helps a freight and logistics business meet the challenges of the global marketplace. As a result, the freight and logistics business can achieve the clarity, consistency, and well-defined execution of core processes that reduce inefficiencies and waste that result from unnecessary process complexity and exceptions. In addition, the high-performance capability assessment model helps the freight and logistics business to identify specific areas in which improvements may be made, to understand how to make said improvements, and to establish levels of capability along the way to reaching an ultimate capability goal.

17 Claims, 13 Drawing Sheets

OTHER PUBLICATIONS

Brochure, "High Performance Acceleration: Global Retail Process Model," Accenture, High Performance Delivered, 2007.

Handbook, Software Engineering Institute, "A Description of the Systems Engineering Capability Maturity Model Appraisal Method Version 1.1," Mar. 1996.

Keith A. Heston, "Achieving Delivery Excellence Using the Capability Maturity Model Integration," *Accenture, High Performance Delivered*, 2006.

Report, Software Engineering Institute, "A Systems Engineering Capability Maturity Model, Version 1.1.," Nov. 1995.

Walker Royce, "CMM vs. CMMI: From Conventional to Modern Software Management," *The Rational Edge*, 2002.

Non-Final Office Action dated Apr. 28, 2011, issued in related U.S. Appl. No. 12/129,080.

* cited by examiner

FREIGHT AND LOGISTICS HIGH PERFORMANCE CAPABILITY ASSESSMENT

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance level of key capability areas within the processes of a freight and logistics organization.

2. Background Information

Modern freight and logistics organizations operate in an increasingly challenging environment. To survive, freight and logistics organizations must adapt to this environment and execute in a clear, consistent, and efficient manner. Furthermore, the competitive nature, low profit margins, and foreign competitive challenges of freight and logistics businesses greatly increase the complexity and difficulty of surviving on a day-to-day basis.

Despite the need for a freight and logistics organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the freight and logistics business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As freight and logistics businesses struggle to meet the demands of the modern economic landscape, they fail to identify opportunities for maximizing sales and margin improvement, category expansion, multi-channel execution, customer satisfaction improvement, and to reach other important goals.

Therefore, a need exists for an efficient and effective system and method to assess the performance level of key assessment areas within the processes of an organization.

SUMMARY

A high-performance capability assessment (HPCA) model helps freight and logistics businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Competitive' mastery level, and a 'Market Leading' mastery level. Each performance mastery level includes criteria specific to a corresponding key assessment area. Each key assessment area identifies some aspect of a capability of a business.

A business capability can be defined as a bundle of closely integrated skills, knowledge, technologies, and cumulative learning that is exercised through a set of processes and that collectively represents an organization's ability to create value by producing outcomes and results. Capability area does not represent a delineation of organizational responsibilities as the business outcomes of a capability may be the result of a number of cross-functional teams. Capabilities of a business may be grouped into platforms. For example, the HPCA model groups the capabilities of the freight and logistics industry into seven high-level platforms, including a customer interaction platform, an enablement platform, an asset management platform, a contract logistics platform, a transportation platform, a supplemental services platform, and an enterprise platform. Examples of capabilities within the customer interaction platform, for example, include channel management, product management, pricing, marketing, sales, booking and order management, solutions management, customer service, and invoicing. Platforms may include sub-platforms, as well as capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the customer interaction platform includes channel management, product management, pricing, marketing, sales, booking and order management, solutions management, customer service, and invoicing. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The freight and logistics industry high-performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
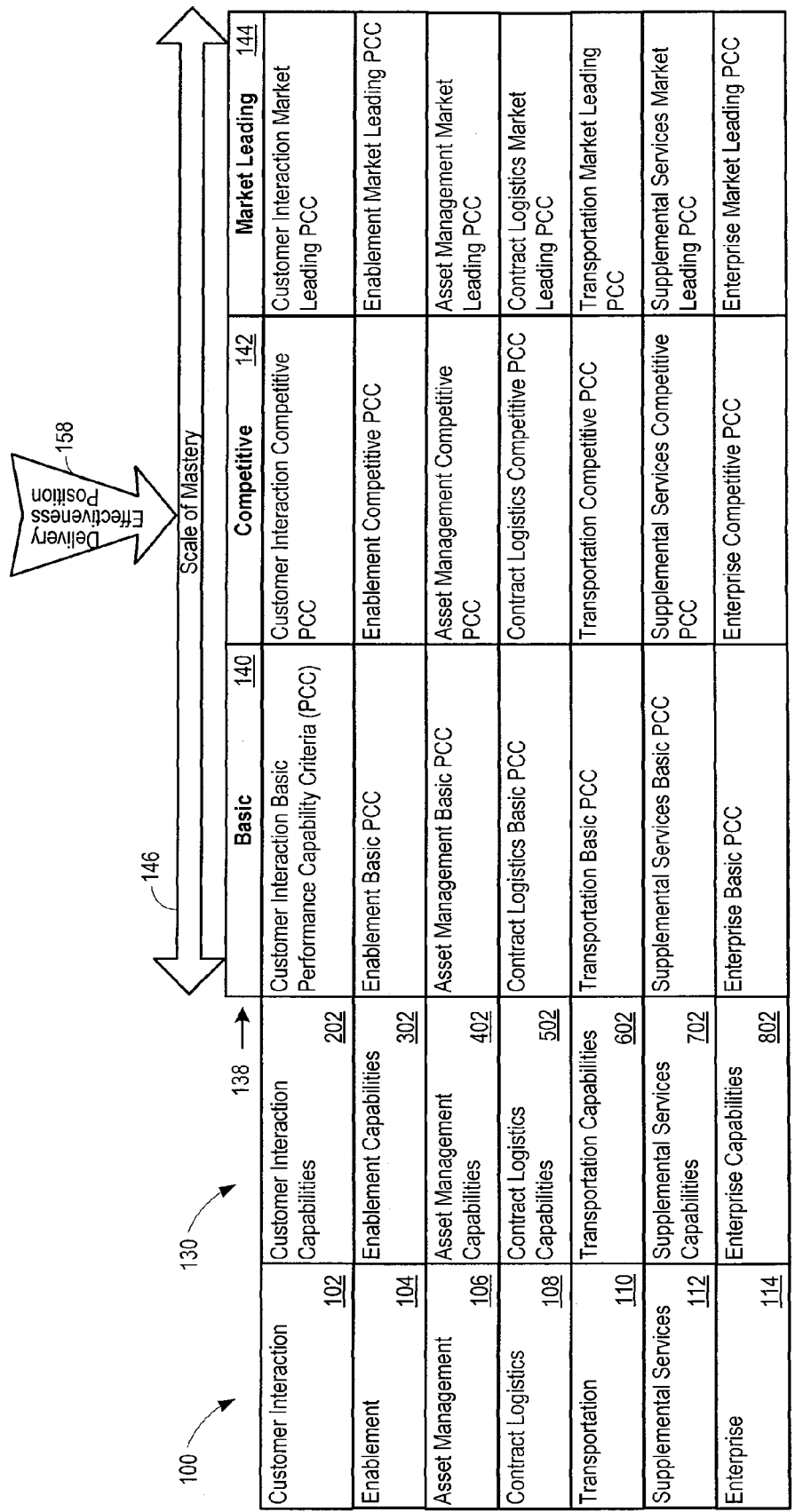
FIG. 1 shows a high-performance capability assessment model with a performance scale of mastery and performance criteria shown for different capabilities.

FIG. 1 shows a high-performance capability assessment (HPCA) model 100. The HPCA model 100 specifies seven high-level platforms, including a customer interaction platform 102, an enablement platform 104, an asset management platform 106, a contract logistics platform 108, a transportation platform 110, a supplemental services platform 112, and an enterprise platform 114. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple <platform name> capabilities 130.

The HPCA model 100 establishes a multidimensional freight and logistics industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Competitive' 142 delivery level and a 'Market Leading' 144 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Competitive' delivery level 142 specifies 'Competitive' performance assessment criteria, and the 'Market Leading' delivery level 144 specifies 'Market Leading' performance assessment criteria. The HPCA model 100 receives input data that specifies a freight and logistics business platform (e.g., a freight and logistics industry area) and a freight and logistics industry key assessment area for analysis. The HPCA model 100 searches the multidimensional freight and logistics industry performance reference set for a matching key assessment performance reference table that matches the freight and logistics industry platform and corresponding industry capability within the platform and the freight and logistics industry key assessment area, and retrieves the matching key assessment performance reference table. The HPCA model 100 initiates analysis of the matching key assessment performance reference table to obtain a resultant performance assessment level for the freight and logistics industry key assessment area.

Tables 1-3 below provide an explanation of each of the capability levels 140, 142, and 144.

TABLE 1

'Basic' Delivery Level

| Description: | Capability mastery at a basic level is uncompetitive on a domestic and global basis. |
|---|---|

TABLE 2

'Competitive' Delivery Level

| Description: | Capability mastery at a competitive level is in the top 50% of performers when compared to international peer groups. |
|---|---|

TABLE 3

'Market Leading' Delivery Level

| Description: | Capability mastery at a market leading level implies that few companies globally are performing at this level, and can an include emerging capabilities where companies have committed investment dollars. |
|---|---|

For FIGS. 2-8 the capability under evaluation may be assigned a level of mastery 138 based on the business' position along the scale of mastery 146 (e.g., the 'basic,' 'competitive,' or 'market leading' delivery level). Performance criteria corresponding to the basic 140, competitive 142, and market leading 144 performance levels populate the HPCA model 100. The performance criteria capture characteristics, and/or other features of the delivery of a capability at a particular performance level. Examples below illustrate performance criteria that provide analysis and benchmarking for freight and logistics organizations. The HPCA model 100 performance criteria provide a tool for determining where a platform and capability under examination falls along the scale of mastery 146.

For example, business consultants and business process engineers may interview a business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high-performance capability assessments may be collected and stored with the performance criteria for future retrieval and possible modification in a capability detail pool, discussed below.

Figure 2:
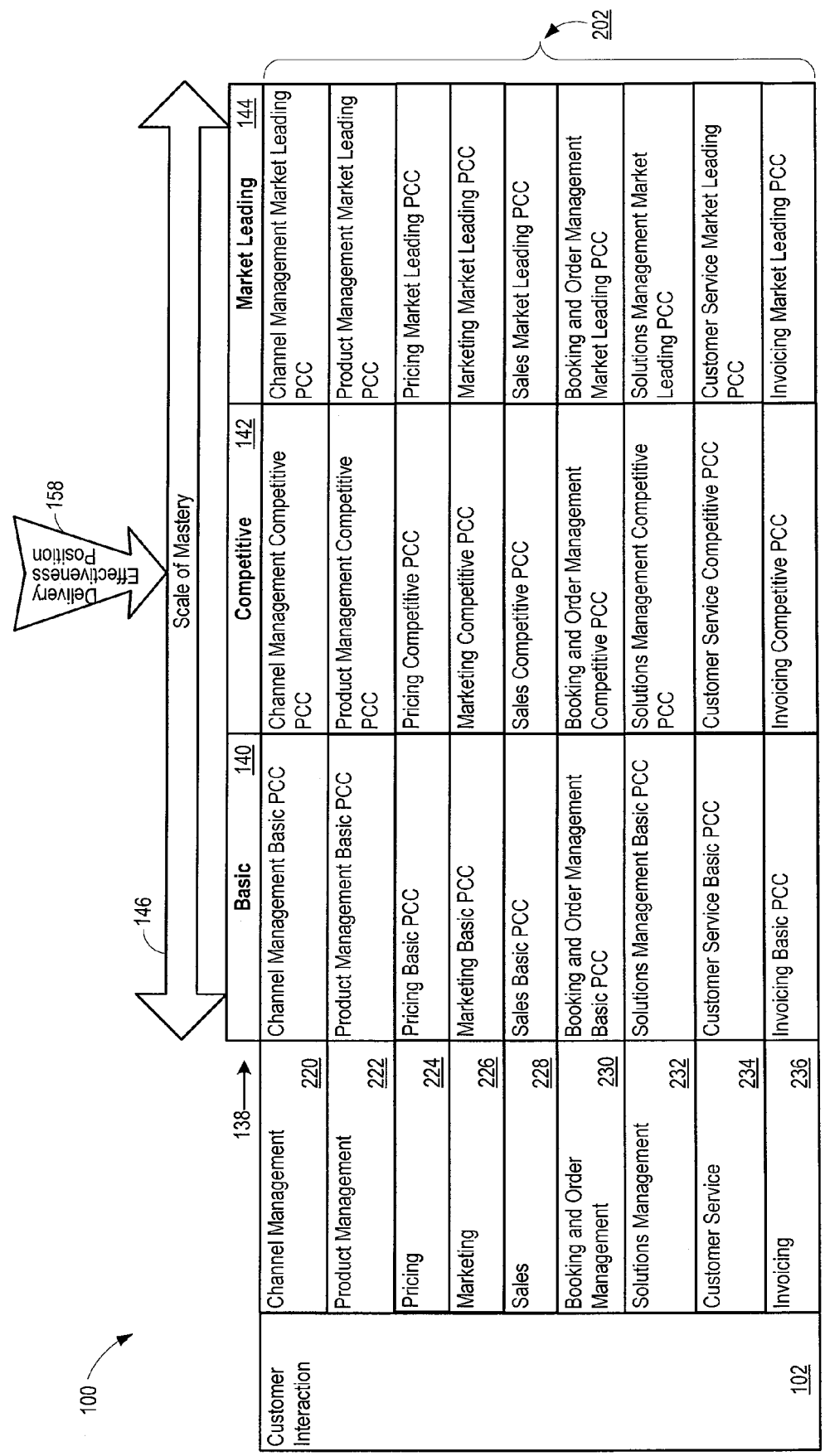
FIG. 2 shows a high-performance capability assessment model with customer interaction capabilities shown.

FIG. 2 shows the customer interaction platform 102 divided into respective capability areas 202. The customer interaction platform 102 includes a channel management capability 220, a product management capability 222, a pricing capability 224, a marketing capability 226, a sales capability 228, a booking and order management capability 230, a solutions management capability 232, a customer service capability 234, and an invoicing capability 236.

Figure 3:
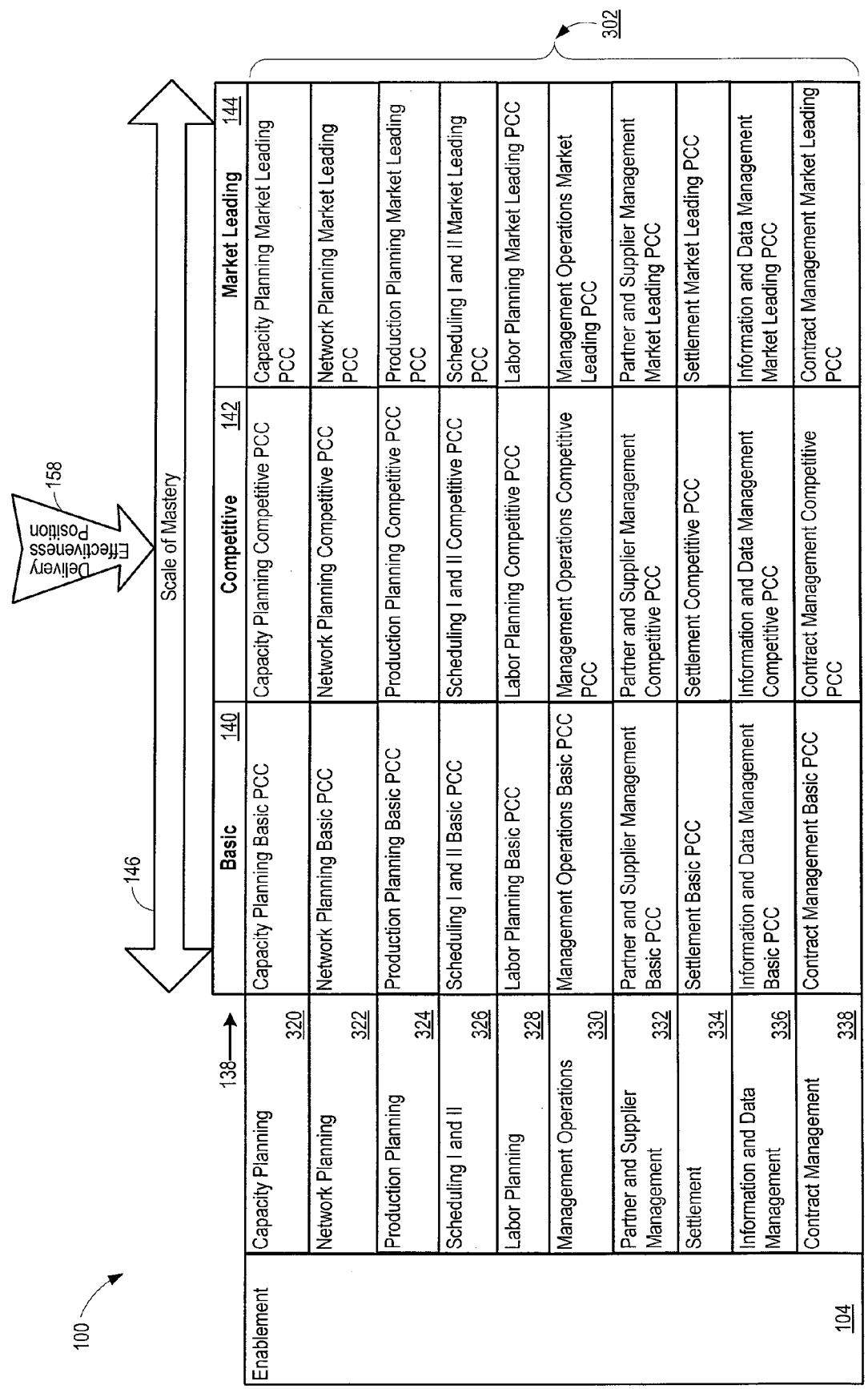
FIG. 3 shows a high-performance capability assessment model with enablement capabilities shown.

FIG. 3 shows the enablement platform 104 divided into respective capability areas 302. The enablement platform 104 includes a capacity planning capability 320, a network planning capability 322, a production planning capability 324, a scheduling I and II capability 326, a labor planning capability 328, a management operations capability 330, a partner and supplier management capability 332, a settlement capability 334, an information and data management capability 336, and a contract management capability 338.

Figure 4:
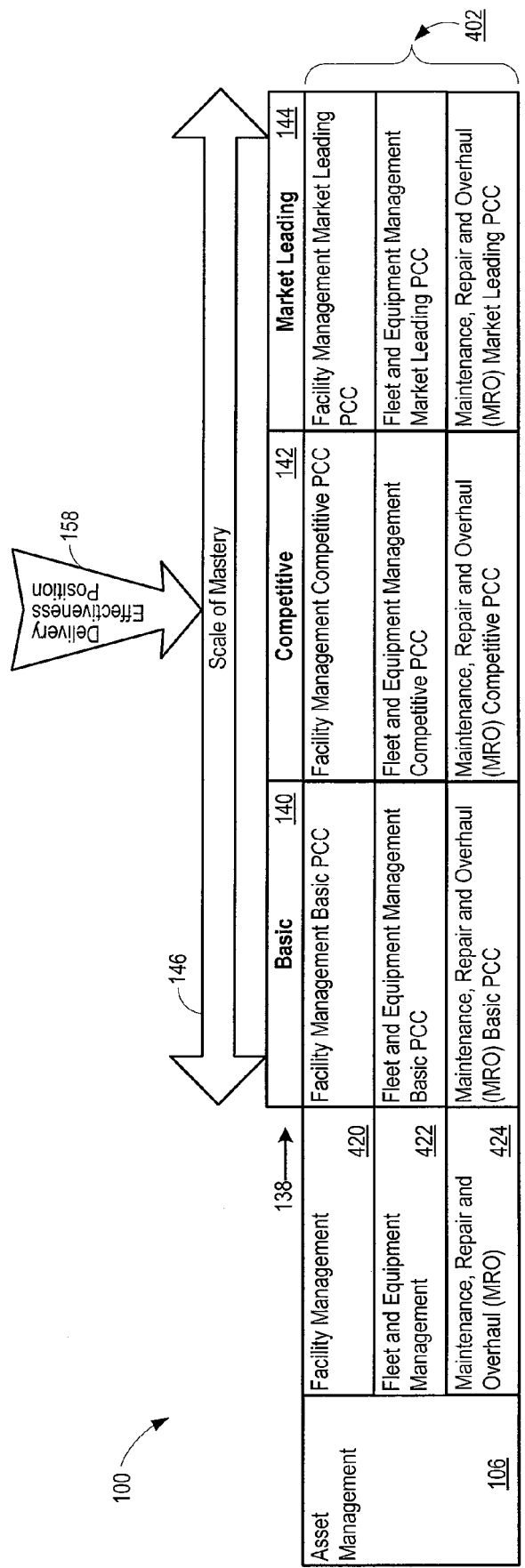
FIG. 4 shows a high-performance capability assessment model with asset management capabilities shown.

FIG. 4 shows the asset management platform 106 divided into respective capability areas 402. The asset management platform 106 includes a facility management capability 420, a fleet and equipment management capability 422, and a maintenance, repair, and overhaul (MRO) capability 424.

Figure 5:
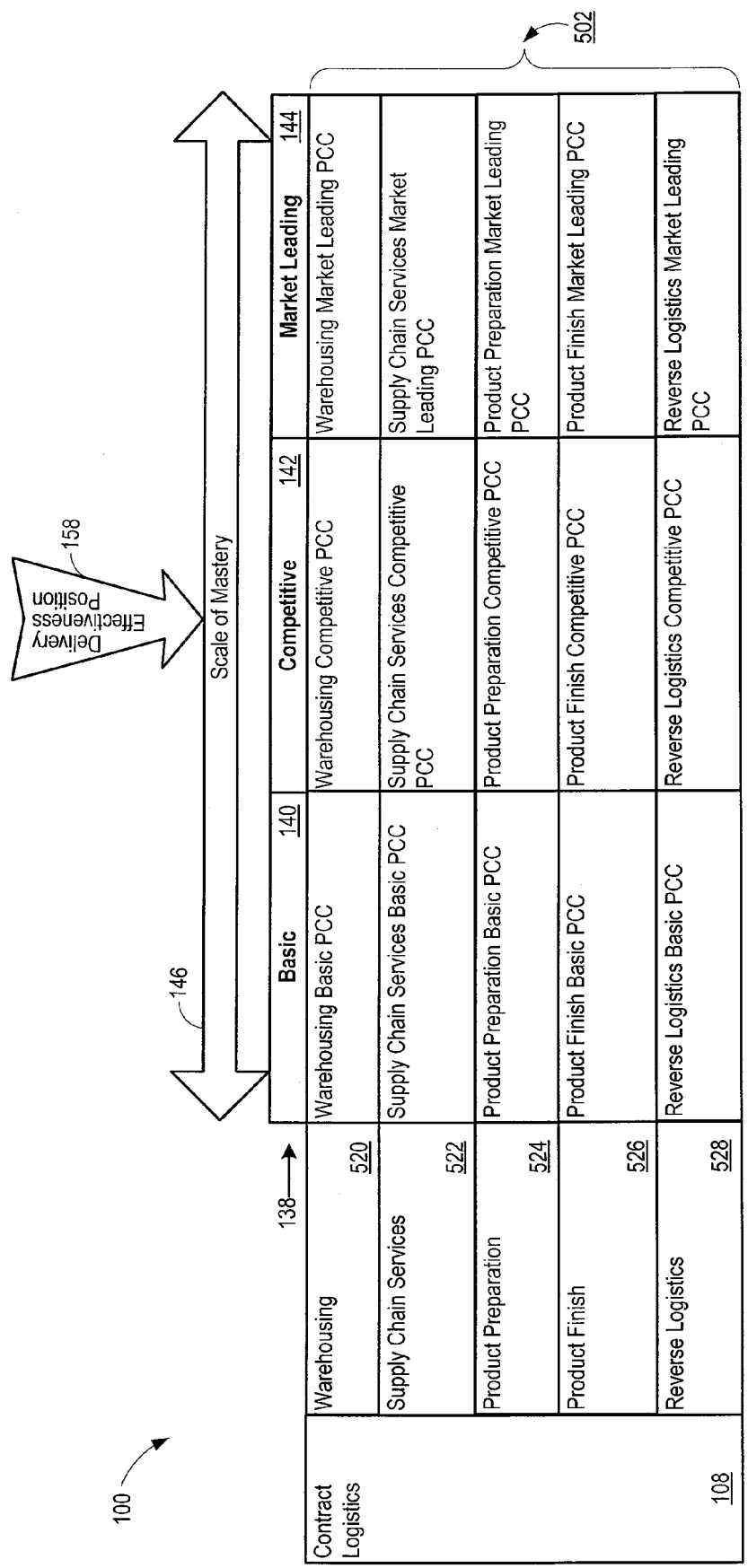
FIG. 5 shows a high-performance capability assessment model with contract logistics capabilities shown.

FIG. 5 shows the contract logistics platform 108 divided into respective capability areas 502. The contract logistics platform 108 includes a warehousing capability 520, a supply chain services capability 522, a product preparation capability 524, a product finish capability 526, and a reverse logistics capability 528.

Figure 6:
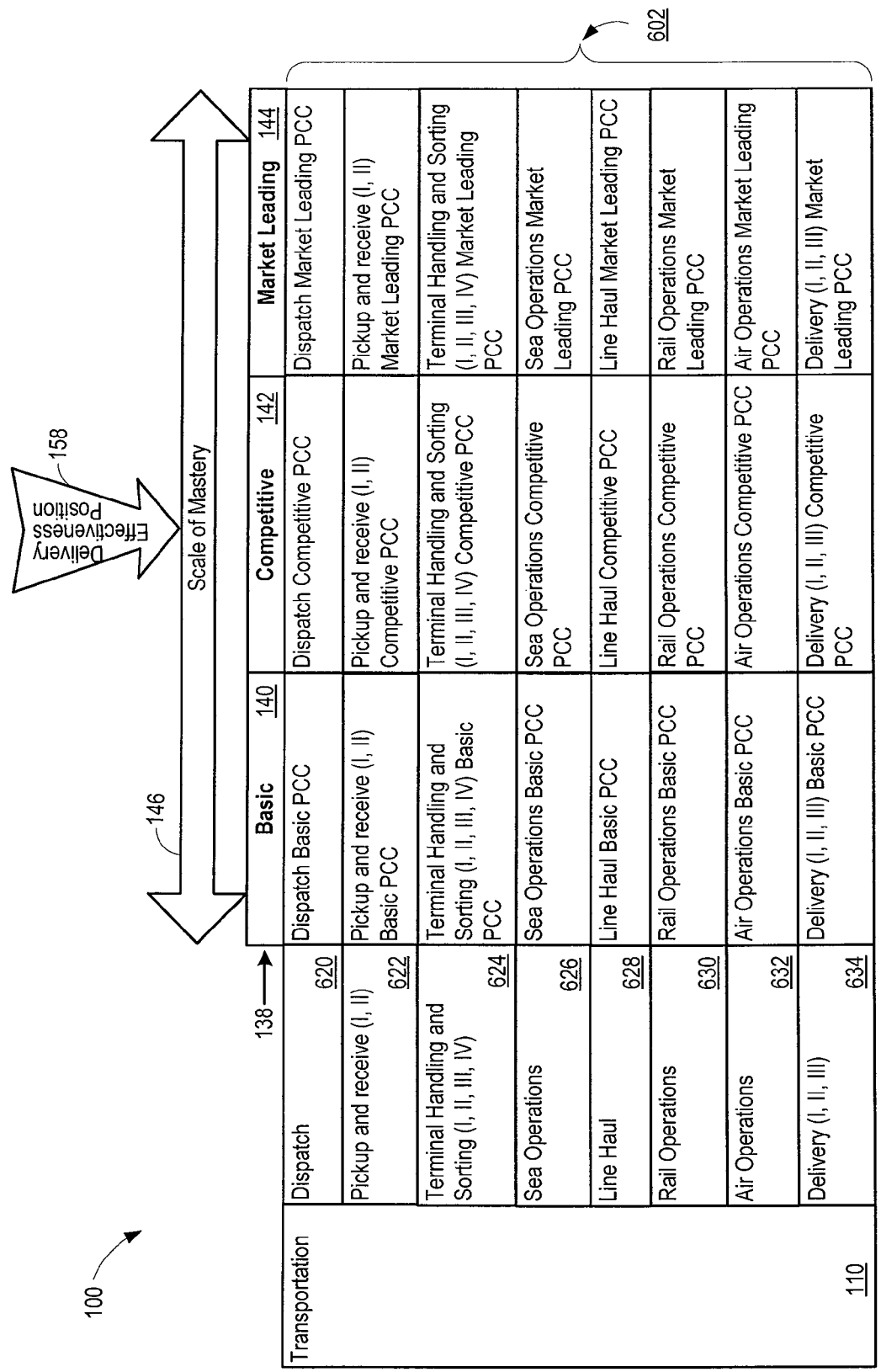
FIG. 6 shows a high-performance capability assessment model with transportation capabilities shown.

FIG. 6 shows the transportation platform 110 divided into respective capability areas 602. The transportation platform 110 includes a dispatch capability 620, a pickup and receive (I, II) capability 622, a terminal handling and sorting (I, II, III, IV) capability 624, a sea operations capability 626, a line haul capability 628, a rail operations capability 630, an air operations capability 632, and a delivery (I, II, III) capability 634.

Figure 7:
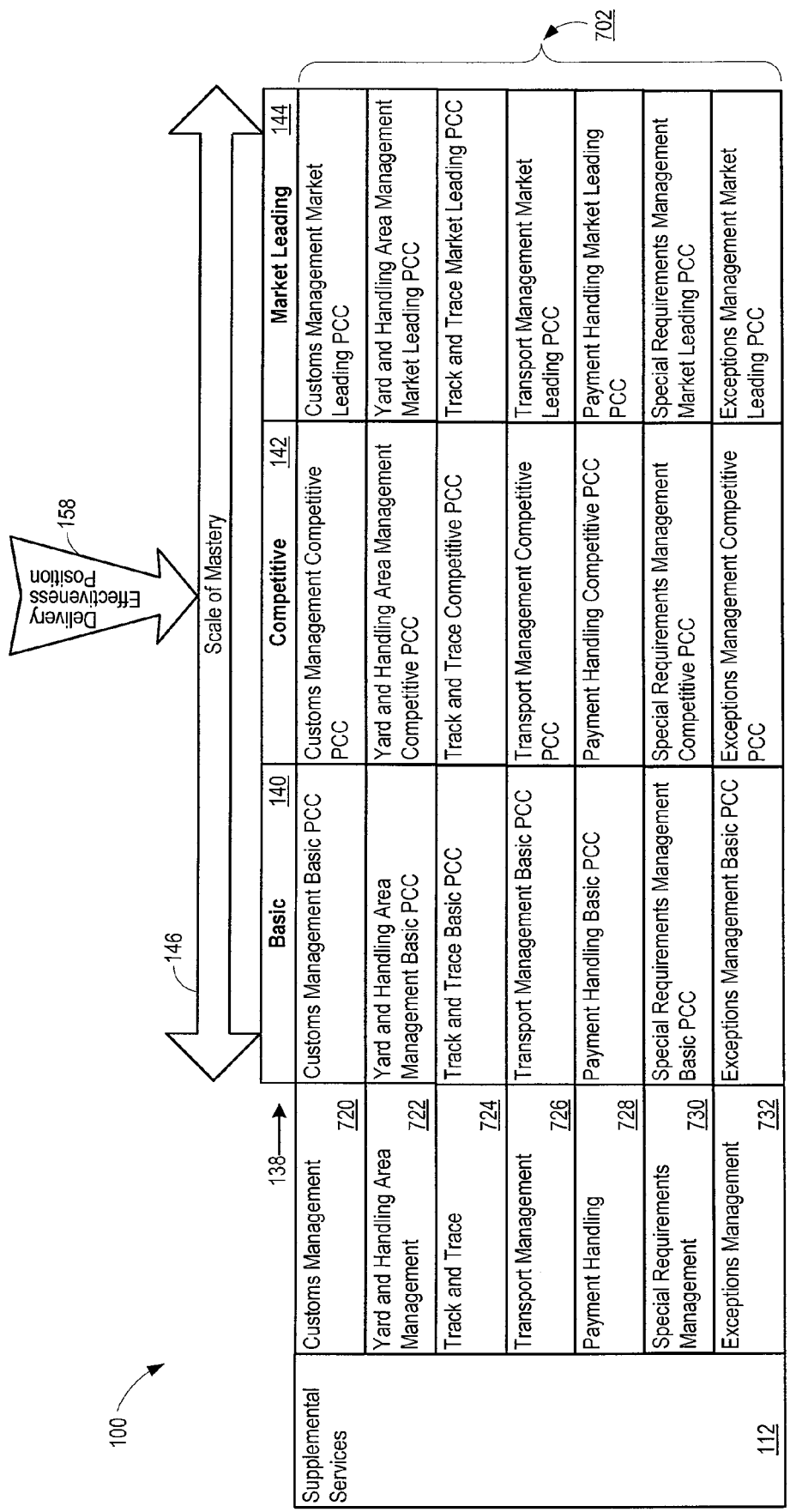
FIG. 7 shows a high-performance capability assessment model with supplemental services capabilities shown.

FIG. 7 shows the supplemental services platform 112 divided into respective capability areas 702. The supplemental services platform 112 includes a customs management capability 720, a yard and handling area management capability 722, a track and trace capability 724, a transport management capability 726, a payment handling capability 728, a special requirements management capability 730, and an exceptions management capability 732.

Figure 8:
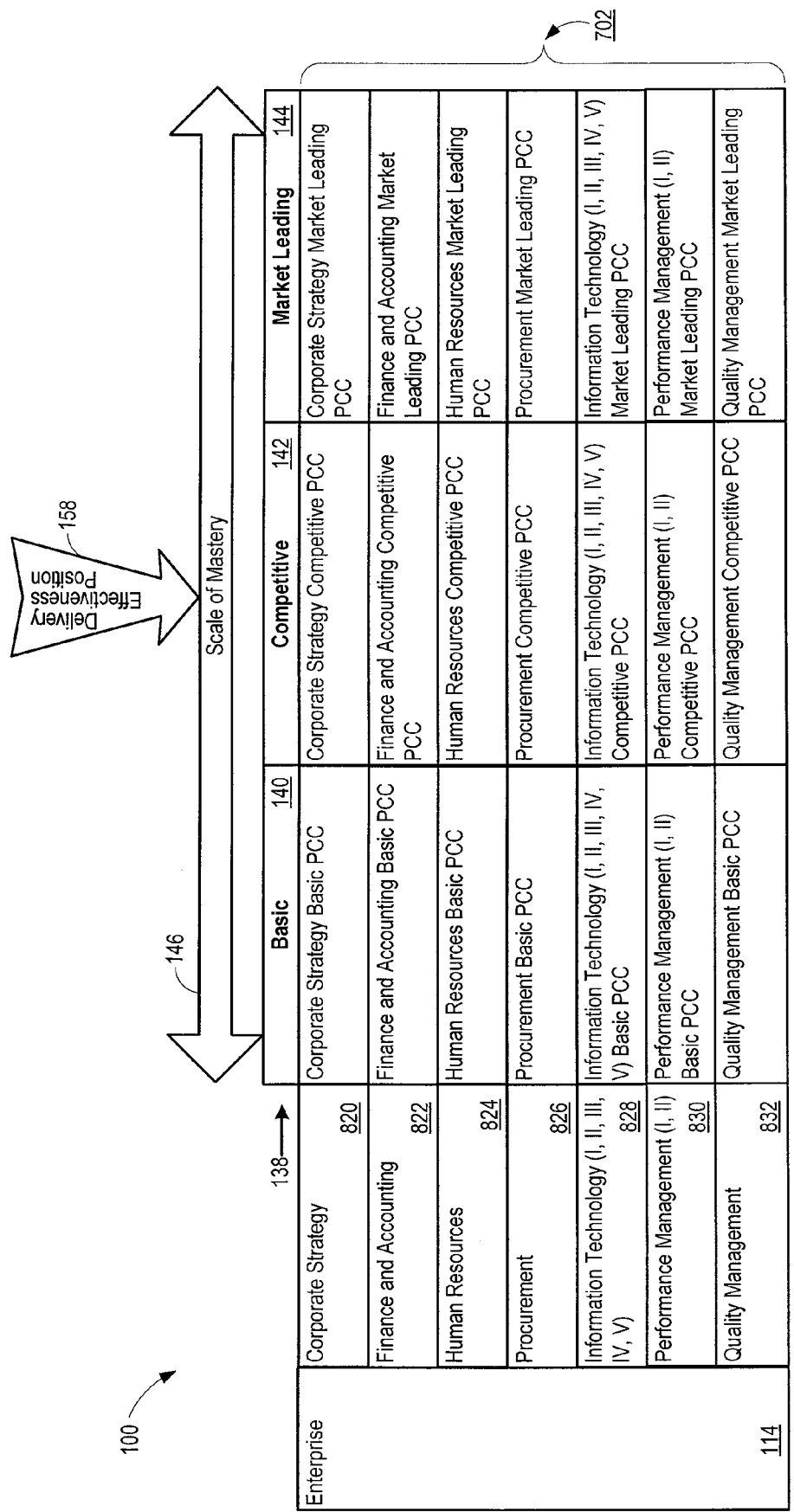
FIG. 8 shows a high-performance capability assessment model with enterprise capabilities shown.

FIG. 8 shows the enterprise platform 114 divided into respective capability areas 802. The enterprise platform 114 includes a corporate strategy capability 820, a finance and accounting capability 822, a human resources capability 824, a procurement capability 826, an information technology (I, II, III, IV, V) capability 828, a performance management (I, II) capability 830, and a quality management capability 832.

The tables provided in the appendix immediately following the abstract, which form part of this disclosure, provide an explanation of the capabilities and corresponding key assessment areas and performance criteria for each capability within the respective platforms. Each capability may include one or more key assessment areas. Each key assessment area may include one or more additional key assessment areas. In other words, a business capability may include sub-capabilities, and therefore, key assessment areas corresponding to the multiple sub-capabilities. The tables in the appendix show specific criteria used to analyze each capability.

Figure 9:
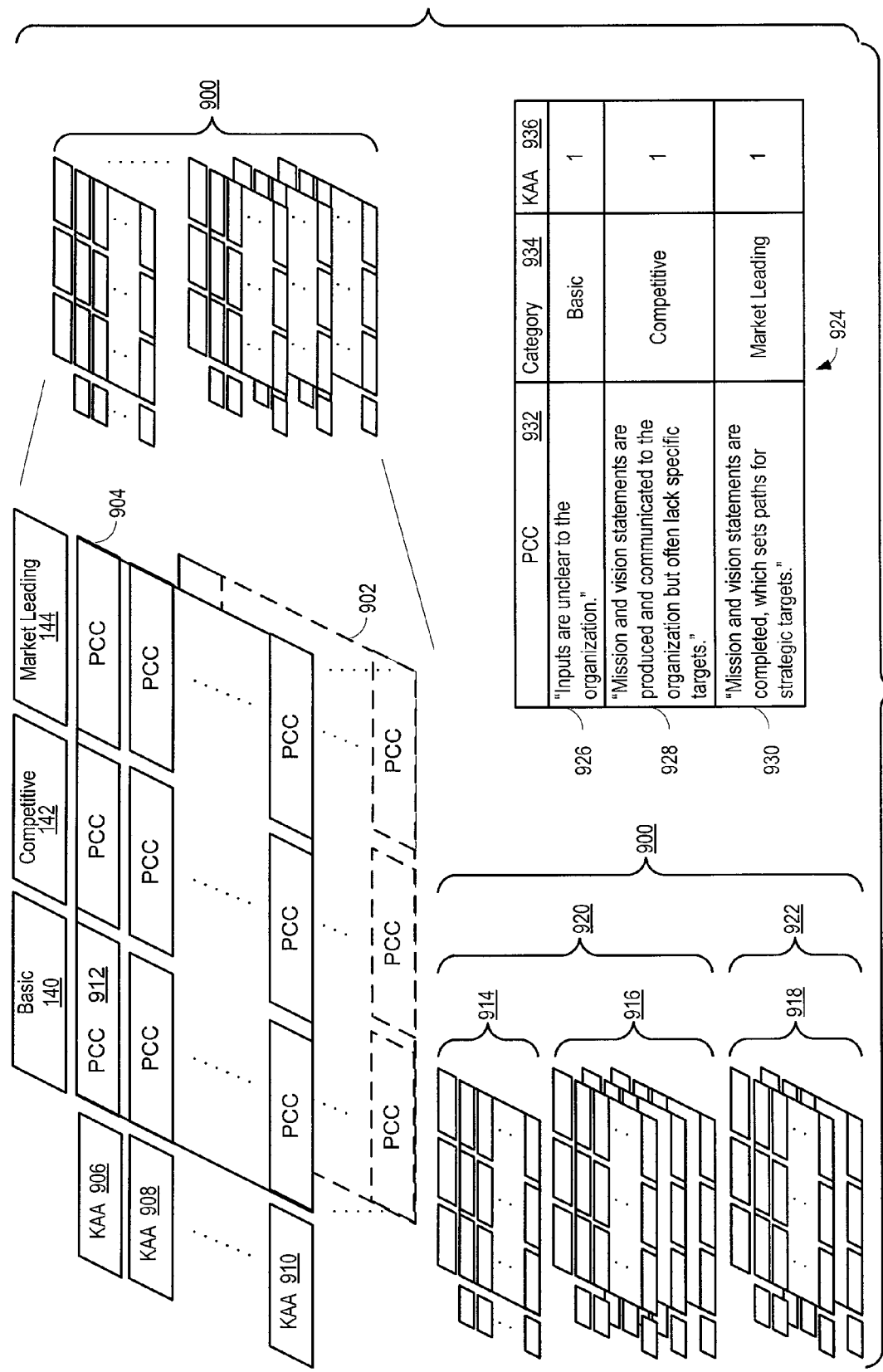
FIG. 9 shows a capability detail pool providing a multidimensional freight and logistics industry performance reference set where multiple key assessment performance reference tables are collected and stored.

FIG. 9 shows a multidimensional freight and logistics industry performance reference set 900 ("reference set 900") that provides a capability detail pool from which the system described below may obtain benchmarking tables for a freight and logistics business. The reference set 900 includes multiple key assessment performance reference tables ("reference tables"), two of which are labeled 902 and 904. Each reference table may provide the benchmarking criteria for a specific capability, such as those noted above with respect to FIGS. 2-8.

One dimension of each table may establish the 'Basic' performance level 140 specifying 'Basic' performance assessment criteria, the 'Competitive' performance level 142 specifying 'Competitive' performance assessment criteria, and the 'Market Leading' performance level 144 specifying 'Market Leading' performance assessment criteria. Another dimension of each table may specify one or more key assessment areas (KAAs), several of which are labeled 906, 908, and 910. As noted above, performance criteria, e.g., the PCC 912, populates each key assessment performance reference table to provide benchmark criteria for 'Basic,' Competitive; and 'Market Leading' characteristics.

The reference set 900 represents the HPCA model 100. Consistent with the HPCA model 100, the reference set 900 may organize multiple reference tables into a hierarchical structure defining discrete changes in granularity. In one implementation, the hierarchical structure includes reference tables, sub-platforms, platforms, and models. FIG. 9 labels three sub-platforms 914, 916, and 918. The reference set 900 may further organize the platforms into sub-platforms, two of which are labeled 920 and 922. Platforms aggregate into the HPCA model 100 and corresponding reference set 900. Additional, different, or fewer levels of granularity may be defined in the HPCA model 100.

The reference set 900 may dynamically populate the reference tables with the most up-to-date performance criteria, for example upon retrieval and presentation by a business analysis consultant. The performance criteria may be retrieved from a performance capability criteria database or other information source.

FIG. 9 also shows an example of a database implementation 924 of a portion of a reference table. In particular, the database implementation 924 includes records (e.g., the records 926, 928, 930) that establish each PCC 912. In the example shown, each record includes a PCC field 932, a category specifier field 934, and a KAA specifier field 936. Other fields may be provided, such as a reference table assignment field or reference set assignment field. The records categorize each PCC into a specific category (e.g., 'Basic'), into a specific KAA, and, optionally, into a specific reference table in a specific reference set for any particular HPCA model.

Figure 10:
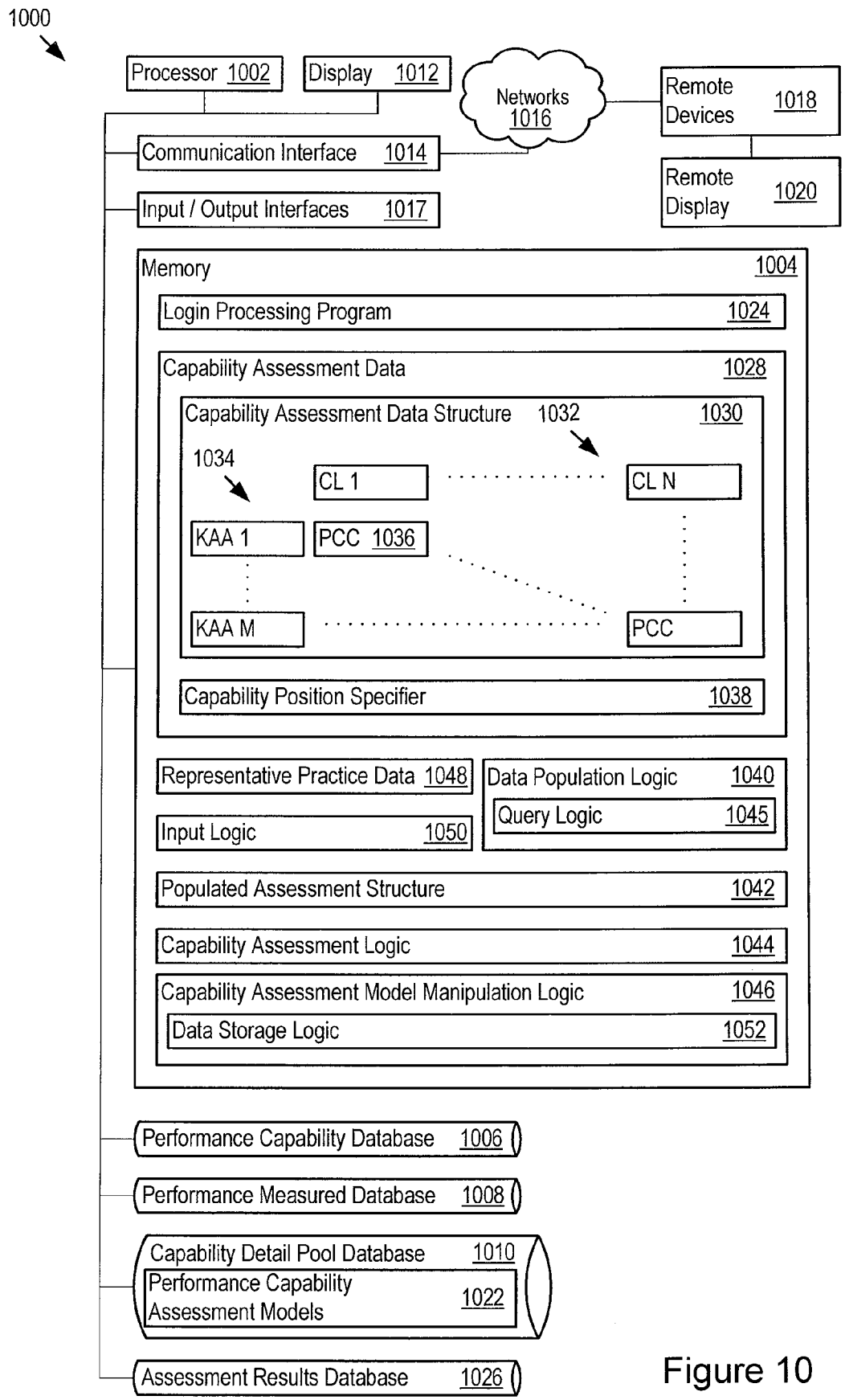
FIG. 10 shows a capability assessment system.

FIG. 10 shows a high-performance capability assessment system ("system") 1000. The system 1000 includes a processor 1002 and a memory 1004. Several databases support the operation of the system 1000, including a performance capability database 1006, a performance measured database 1008, a capability detail pool database 1010, and an assessment results database 1026. The system 1000 may include a local display 1012 and input/output interfaces 1017 (e.g., including a keyboard, mouse, microphone, speakers, or other device), and, through the communication interface 1014 and networks 1016, may communicate with remote devices 1018 and remote displays 1020. The networks 1016 may be any combination of external networks (e.g., the Internet) and internal networks (e.g., corporate LANs). The displays 1012 and 1020 may, for example, present performance capability assessment models 1022 that the system 1000 retrieves from the capability detail pool database 1010 for review, modification, and application by process engineers or other individuals. With regard to local access or access by the remote devices 1018, the system 1000 may include a login processing program 1024 to authenticate and/or authorize access to the system 1000. To that end, the login processing program 1024 may include username/password verification, private/public key encryption, or other validation and data protection capabilities.

In one implementation, the capability performance database 1006 stores performance criteria. As will be described in more detail below, the system 1000 may populate performance capability assessment models with performance capability criteria suited to any particular platform (e.g., customer interaction platform 102, an enablement platform 104, an asset management platform 106, a contract logistics platform 108, a transportation platform 110, a supplemental services platform 112, and an enterprise platform 114) and business capability at one or more capability levels across one or more key assessment areas. The performance measured database 1008 may store the determined, measured, or otherwise ascertained characteristics, criteria, and other measured data of a particular key assessment area as representative practice data 1048. The representative practice data 1048 may be obtained through interviews with business consultants and industrial engineers, through online questionnaires, through manual or automated analysis of business data (e.g., year-end operating reports), or in other manners. The capability detail pool database 1010 stores the capability detail pool 900, which includes pre-defined performance capability assessment models 1022. The assessment results database 1026 stores determined capability levels for specific capabilities that have been analyzed.

The system 1000 facilitates the review, modification, creation, and application of performance capability assessment models. In that role, performance capability assessment model manipulation logic ("manipulation logic") 1046 within the system 1000 creates, retrieves, and stores capability assessment data 1028 in the memory 1004. The manipulation logic 1046 may establish capability assessment data 1028 in the memory 1004, including a capability assessment data structure 1030 with multiple capability levels ("CL") 1032 organized along a scale of mastery dimension, multiple key assessment areas ("KAA") 1034 organized along a key factor dimension, and performance criteria ("PCC") 1036 that populates the performance capability assessment model 1030. The manipulation logic 1046 may vary widely in implementation, and, as one example, may include data storage logic 1052 that saves data in memory and user interface logic that accepts capability level specifications, key assessment area specifications, and performance capability criteria inputs to create new performance capability assessment models, to modify existing performance capability assessment models, to delete performance capability assessment models, or to retrieve performance capability assessment models for review.

In one implementation, the manipulation logic 1046 establishes the capability assessment data structure 1030 to include a multidimensional freight and logistics industry performance reference set that includes multiple key assessment performance reference tables in which the key assessment performance reference tables include a 'Basic' capability performance level, a 'Competitive' capability performance level, and a 'Market Leading' capability performance level.

The capability assessment data 1028 may also include a capability position specifier 1038. The capability position specifier 1038 may record the capability level along the scale of mastery 146, as determined for any particular capability. Thus, the system 1000 may store the performance level in the assessment results database 1026 or elsewhere for future retrieval and review.

In one implementation, the data population logic 1040 may be a data population program executed by the processor 1002 that populates template performance capability assessment models. For example, the data population logic 1040 may include input logic 1050 that accepts input specifying a capability of interest that indicates a particular performance capability assessment model. The data population logic 1040 may include query logic 1045 that executes database queries and prompts a user for input to obtain the corresponding performance capability criteria for the capability of interest.

In another implementation, for example, the query logic 1045 may receive an input specifying a freight and logistics industry area and a freight and logistics industry key assessment area with the freight and logistics industry area for analysis. The query logic 1045 searches the multidimensional freight and logistics industry performance reference set for a matching key assessment performance reference table that matches the freight and logistics industry area and the freight and logistics industry key assessment area, and retrieves the matching key assessment performance reference table.

The data population logic 1040 may further include storage logic that adds the retrieved performance capability criteria to the template performance capability assessment model. The data population logic 1040 produces populated performance capability assessment structures 1042 that may be stored in the capability detail pool database 1010.

In addition to the analysis process described above, the system 1000 may provide an automated analysis of representative practice data 1048 that identifies relevant performance capability criteria and determines the position on the scale of mastery 146 of each key assessment area corresponding to the performance capability criteria for the representative practice data 1048. As one example, the system 1000 may implement capability assessment logic 1044 that includes comparison and/or matching logic that analyzes the representative practice data 1048 with respect to performance capability criteria to locate key assessment areas for which the system 1000 can determine capability levels to obtain a resultant performance level for each key assessment area.

Furthermore, the capability assessment logic 1044 may determine an overall position on the scale of mastery 146 as the capability position specifier 1038 for a capability under examination given the knowledge of where the key assessment areas corresponding to the capability under examination fall in each capability level. Thus, for example, the capability assessment logic 1044 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 1044 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 11:
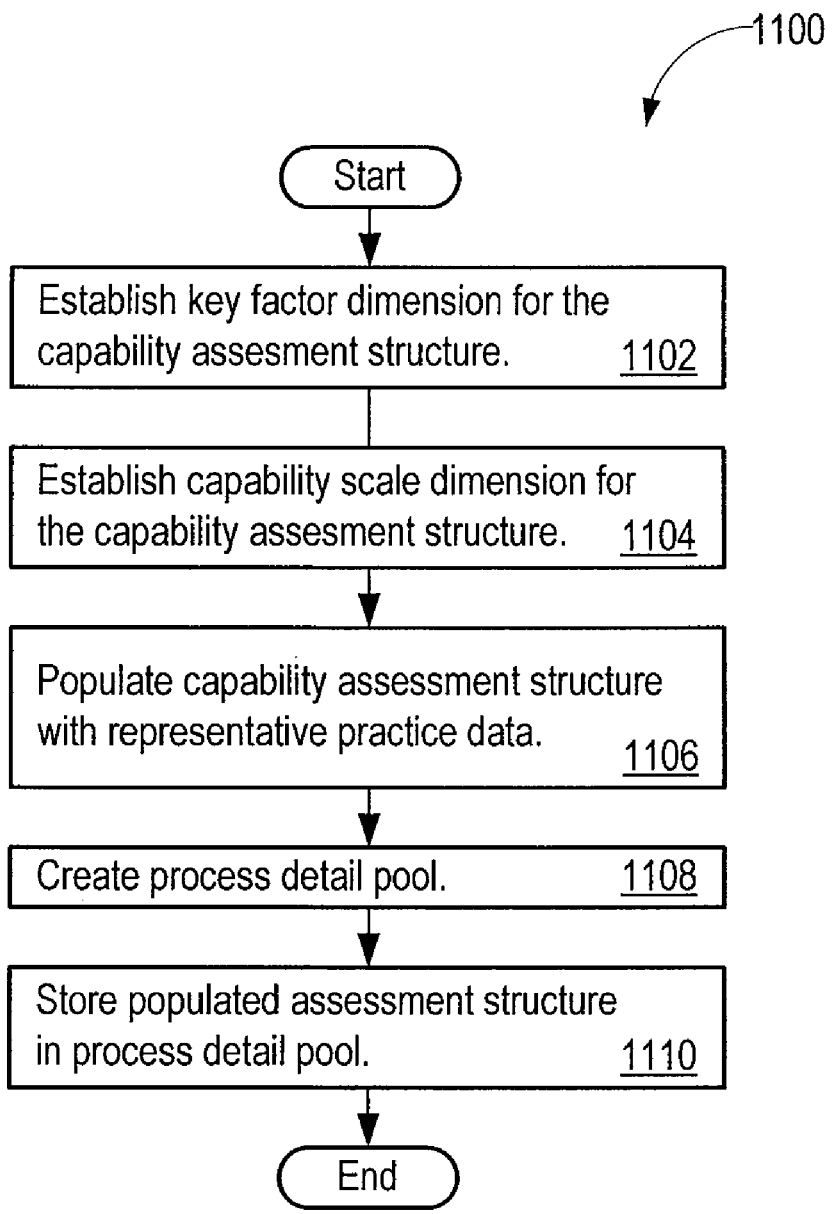
FIG. 11 shows a flow diagram for establishing high-performance capability assessment models.

FIG. 11 shows a flow diagram 1100 for creating performance capability assessment models. The performance capability assessment model creator (e.g., the manipulation logic 1046) establishes a key factor dimension for the performance capability assessment model (1102). The performance capability assessment model creator also establishes a capability scale dimension for the performance capability assessment model (1104). The capability scale dimension may define a scale of increasing organizational capability. For example, the structure creator may create the 'Basic' level 140, the 'Competitive' level 142, and the 'Market Leading' level 144. The performance capability assessment model creator also populates the performance capability assessment model with capability performance criteria (1106). A capability detail pool 900 may be formed to hold multiple tailored key assessment performance reference tables (1108). The performance capability assessment model creator may store the populated assessment structure in the capability detail pool for subsequent retrieval and analysis (1110).

Figure 12:
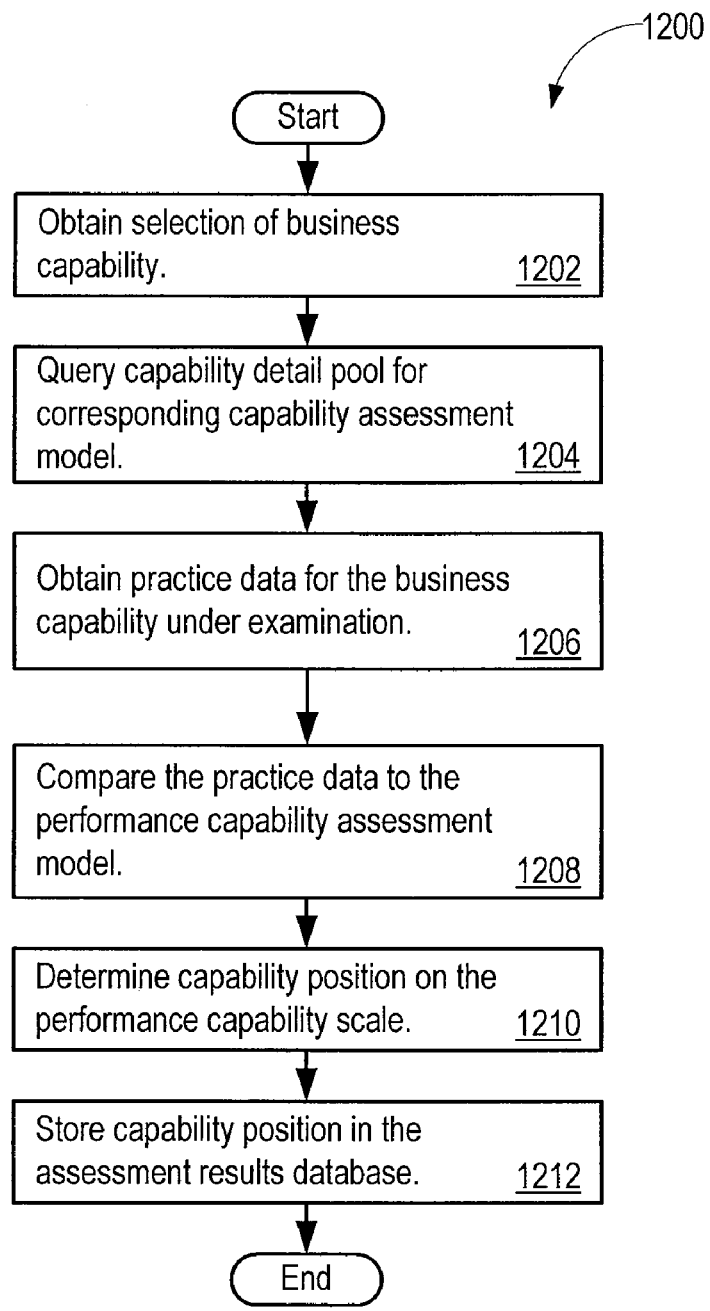
FIG. 12 shows a flow diagram for retrieving and applying high-performance capability assessment models.

FIG. 12 shows a flow diagram 1200 for retrieving and applying performance capability assessment models. A selection of a capability to be analyzed is obtained (1202). In one implementation, the system 1000 receives input data that specifies a freight and logistics industry area and a freight and logistics industry key assessment area for analysis. For example, the system 1000 may accept input from a business consultant that specifies a capability for analysis. The system 1000 may query the capability detail pool 900 for a corresponding performance capability assessment model (1204). The corresponding performance capability assessment model may be pre-defined in the capability detail pool 900, or the data population logic 1040 (or other actor) may populate a performance capability assessment model template that the system 1000 newly creates, or that the system 1000 retrieves from a data store, such as the capability detail pool database 1010.

In another example, the system 1000 searches the multidimensional freight and logistics industry performance reference set in the capability detail pool 900 for a matching key assessment performance reference table based on the input data that specifies a freight and logistics industry platform and a freight and logistics industry key assessment area. The system 1000 retrieves the matching key assessment performance reference table and initiates analysis of the matching key assessment performance reference table to obtain a resultant performance level for the freight and logistics industry key assessment area.

The system 1000 obtains representative practice data 1048 for the capability under examination in the specific business under review (1206). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 1000 may retrieve the representative practice data 1048 from a database of previously obtained representative practice data.

The system 1000 compares the representative practice data 1048 to the performance criteria in the performance capability assessment model (1208). For example, a business consultant may use his or her expertise to arrive at a determination of level for the business and the capability under examination (1210). Alternatively or additionally, the capability assessment logic 1044 may perform an automated analysis of the assessment results data in the assessment results database 1026 and ascertain the performance level on the scale of mastery 146. The system 1000 may store the assessment results, including the determined performance level, for future reference in the assessment results database 1026 or other location (1212).

Figure 13:
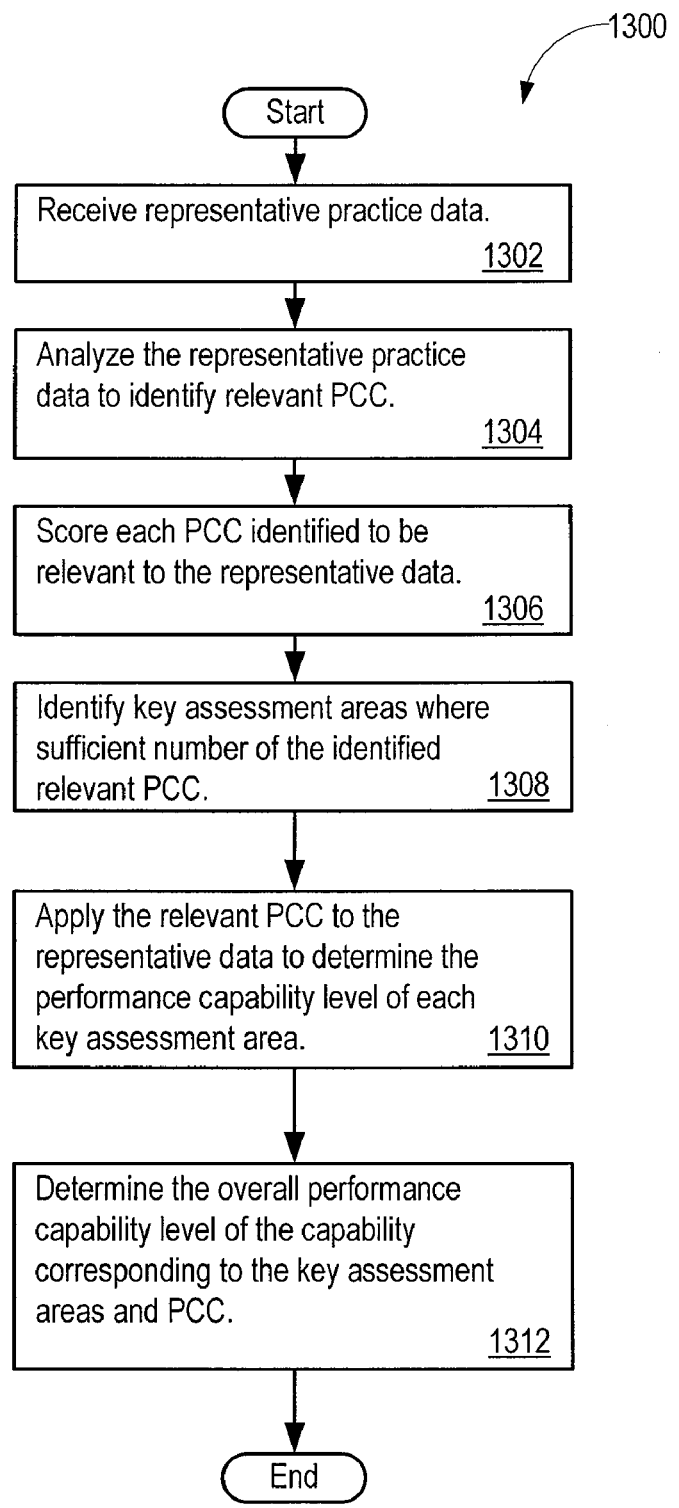
FIG. 13 shows a flow diagram for analyzing representative practice data to determine a freight and logistics industry and a freight and logistics key assessment area to which the representative practice data applies.

FIG. 13 shows a flow diagram 1300 for analyzing representative practice data 1048 to determine a freight and logistics industry and a freight and logistics key assessment area to which the representative practice data applies. The system 1000 receives representative practice data 1048 as input data (1302). The system 1000 may receive the representative practice data 1048 from a database query performed by the query logic 1045 that the query logic executes periodically, when instructed by an operator, and/or automatically against any number of available database sources that store representative practice data 1048. The capability assessment logic 1044 analyzes the representative practice data 1048 to identify performance capability criteria in the capability detail pool 900 that the capability assessment logic 1044 determines relevant to the representative practice data 1048 (1304). For example, the capability assessment logic 1044 may compare and/or match the content of the representative practice data 1048 with the performance capability criteria using natural language processing (NLP), text string, and/or substring matching, by comparing tags linked to the representative practice data 1048 and that specify that any portion of the representative practice data 1048 is applicable to a specific PCC, by querying for a manual classification of the representative practice data 1048 to a PCC, or other matching technique. The capability assessment logic 1044 may score and/or weight a performance capability criteria and compare the score and/or weight to a user specified relevance threshold to rank the relevance of the performance capability criteria to the representative practice data 1048 (1306). The user may specify particular terms and/or phrases to search and match between the performance capability criteria and the representative practice data 1048, in order to score the performance capability criteria.

The capability assessment logic 1044 may determine, based on the number of performance capability criteria that meet or exceed the relevance threshold, that the capability assessment logic 1044 has identified a sufficient number of performance capability criteria for a specific key assessment area in order to determine a performance level for the capability as a whole or any key assessment area within the capability (1308). As one example, where at least 51% of the performance capability criteria for a particular key assessment area meet or exceed the relevance threshold, the capability assessment logic 1044 applies the performance capability criteria to the representative practice data 1048. In another example, the performance capability criteria for a particular key assessment area may be ranked in importance and/or designated as mandatory in order to assess the key assessment area. In the event the capability assessment logic 1044 identifies the mandatory performance capability criteria for a key assessment area, the capability assessment logic 1044 applies the performance capability criteria to the representative practice data 1048.

The capability assessment logic 1044 may apply the performance capability criteria meeting or exceeding the relevance threshold to the representative practice data 1048 to determine whether any particular PCC is met. Accordingly, as the capability assessment logic 1044 analyzes the PCC, the system 1000 tracks the best fit of the representative practice data 1048 to the PCCs in the key assessment performance reference tables. In other words, the system 1000 determines how the representative practice data 1048 meets (or does not meet) each PCC, thereby gaining insight into whether the representative practice data 1048 is indicative of 'Basic,' 'Competitive,' or 'Market Leading' practices.

The system 1000 may also gauge the position on the scale of mastery 146 of each key assessment area corresponding to the performance capability criteria (1310). The capability assessment logic 1044 may further determine an overall position on the scale of mastery 146 for a capability (1312). The capability assessment logic 1044 may establish that a desired number and/or designated mandatory performance capability criteria for the key assessment areas have been identified as relevant to a capability and sufficient to determine the position on the scale of mastery 146 for the capability. For example, the capability assessment logic 1044 may determine an overall performance level for the capability based on the performance level determined for the majority of the key assessment areas. The capability assessment logic 1044 may apply a weighted analysis technique to give more emphasis to some key assessment areas than others in determining the overall position on the scale of mastery 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 1000 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the freight and logistics industry. In particular, the combinations of key assessment areas and particular assessment criteria of the HPCA model, including the criteria noted in the Appendix of Tables, provide significant advantages over other assessment models. The unexpectedly good results include clearly identifying and delineating from among multiple related complex processes the specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for high-performance capability assessment of a freight and logistics business, comprising:
   providing a processor operatively coupled to a communication network;
   providing one or more databases operatively coupled to the processor and accessible through the communication network;
   coupling an interface to the processor for receiving input;
   the processor establishing a machine-readable memory in said one or more databases, including a multidimensional freight and logistics industry performance reference set comprising multiple key assessment performance reference tables, at least one key assessment performance reference table defining a customer interaction platform including:
   a 'Basic' performance level specifying 'Basic' performance assessment criteria;
   a 'Competitive' performance level specifying 'Competitive' performance assessment criteria;
   a 'Market Leading' performance level specifying 'Market Leading' performance assessment criteria;
   establishing customer service assessment criteria,
   wherein the 'Basic' performance assessment criteria includes a first criteria for Customer Relationship Management (CRM) where customer satisfaction only polled on ad-hoc basis;
   wherein the 'Competitive' performance assessment criteria includes a first criteria for CRM where regular surveys sent to customers with improvement suggestions; and
   wherein the 'Market Leading' performance assessment criteria includes a first criteria for CRM where customer satisfaction is closely monitored and relationship management procedures are defined;
   receiving, by the processor, an input specifying a freight and logistics industry area and a freight and logistics industry key assessment area with the freight and logistics industry area for analysis;
   searching, by the processor, the multidimensional freight and logistics industry performance reference set for a matching key assessment performance reference table that matches the freight and logistics industry area and the freight and logistics industry key assessment area;
   retrieving, by the processor, the matching key assessment performance reference table;
   initiating, by the processor, analysis of the matching key assessment performance reference table; and obtaining a resultant performance level for the freight and logistics industry key assessment area.

2. A computer-implemented method for high-performance capability assessment of a freight and logistics business, comprising:
   providing a processor operatively coupled to a communication network;
   providing one or more databases operatively coupled to the processor and accessible through the communication network;
   coupling an interface to the processor for receiving input;
   the processor establishing a machine-readable memory in said one or more databases, including a multidimensional freight and logistics industry performance reference set comprising multiple key assessment performance reference tables, at least one key assessment performance reference table defining a customer interaction platform including:

a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing pricing assessment criteria,
wherein the 'Basic' performance assessment criteria includes a first criteria for Flexibility where basic and additional surcharges can have no interdependencies between them;
wherein the 'Competitive' performance assessment criteria includes a first criteria for Flexibility where through multi stage pricing conditional pricing rules can be defined taking interdependencies between services into account; wherein the 'Market Leading' performance assessment criteria includes a first criteria for Flexibility having support for multiple tariff structures with different inputs within one contract, pricing based on pallets, items or bulk volume;
receiving, by the processor, an input specifying a freight and logistics industry area and a freight and logistics industry key assessment area with the freight and logistics industry area for analysis;
searching, by the processor, the multidimensional freight and logistics industry performance reference set for a matching key assessment performance reference table that matches the freight and logistics industry area and the freight and logistics industry key assessment area;
retrieving, by the processor, the matching key assessment performance reference table;
initiating, by the processor, analysis of the matching key assessment performance reference table; and
obtaining, by the processor, a resultant performance level for the freight and logistics industry key assessment area.

3. A computer-implemented method for high-performance capability assessment of a freight and logistics business, comprising:
providing a processor operatively coupled to a communication network;
providing one or more databases operatively coupled to the processor and accessible through the communication network;
coupling an interface to the processor for receiving input;
the processor establishing a machine-readable memory in said one or more databases, including a multidimensional freight and logistics industry performance reference set comprising multiple key assessment performance reference tables, at least one key assessment performance reference table defining a customer interaction platform including:
a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing product management assessment criteria,
wherein the 'Basic' performance assessment criteria includes a first criteria for Organization and Methods where no dedicated organization for product management exists;
wherein the 'Competitive' performance assessment criteria includes a first criteria for Organization and Methods where Product Management organization has been defined;
wherein the 'Market Leading' performance assessment criteria includes a first criteria for Organization and Methods where product management methodology is available and trained consistently;
receiving, by the processor, an input specifying a freight and logistics industry area and a freight and logistics industry key assessment area with the freight and logistics industry area for analysis;
searching, by the processor, the multidimensional freight and logistics industry performance reference set for a matching key assessment performance reference table that matches the freight and logistics industry area and the freight and logistics industry key assessment area;
retrieving, by the processor, the matching key assessment performance reference table;
initiating, by the processor, analysis of the matching key assessment performance reference table; and
obtaining, by the processor, a resultant performance level for the freight and logistics industry key assessment area.

4. The computer-implemented method of claim 1, further including establishing sales assessment criteria, wherein the 'Basic' performance assessment criteria includes a first criteria for Sales planning where planning is done stand-alone without being aligned with other capabilities.

5. The computer-implemented method of claim 1, further including establishing invoicing assessment criteria, wherein the 'Basic' performance assessment criteria includes a first criteria for Invoice Distribution where paper based invoices exist.

6. The computer-implemented method of claim 1, further including establishing booking and order management assessment criteria, wherein the 'Basic' performance assessment criteria includes a first criteria for Data Entry Performance where mostly manual order data entry is performed into local systems.

7. A computer-readable memory or data storage means encoded with data representing a computer program for a high-performance capability assessment of a freight and logistics business, the computer-readable memory or data storage means causing the computer to perform the acts of:
providing a processor operatively coupled to a communication network;
providing one or more databases operatively coupled to the processor and accessible through the communication network;
coupling an interface to the processor for receiving input;
establishing a machine-readable memory in said one or more databases, including a multidimensional freight and logistics industry performance reference set comprising multiple key assessment performance reference tables, at least one key assessment performance reference table defining a customer interaction platform including:
a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing customer service assessment criteria,
wherein the 'Basic' performance assessment criteria includes a first criteria for Customer Relationship Management (CRM) where customer satisfaction only polled on ad-hoc basis;

wherein the 'Competitive' performance assessment criteria includes a first criteria for CRM where regular surveys sent to customers with improvement suggestions; and wherein the 'Market Leading' performance assessment criteria includes a first criteria for CRM where customer satisfaction is closely monitored and relationship management procedures are defined;

receiving, by the processor, an input specifying a freight and logistics industry area and a freight and logistics industry key assessment area with the freight and logistics industry area for analysis;

searching, by the processor, the multidimensional freight and logistics industry performance reference set for a matching key assessment performance reference table that matches the freight and logistics industry area and the freight and logistics industry key assessment area;

retrieving, by the processor, the matching key assessment performance reference table;

initiating, by the processor, analysis of the matching key assessment performance reference table; and obtaining, by the processor, a resultant performance level for the freight and logistics industry key assessment area.

8. A computer-readable memory or data storage means encoded with data representing a computer program for a high-performance capability assessment of a freight and logistics business, the computer-readable memory or data storage means causing the computer to perform the acts of:

providing a processor operatively coupled to a communication network;

providing one or more databases operatively coupled to the processor and accessible through the communication network;

coupling an interface to the processor for receiving input;

establishing a machine-readable memory in said one or more databases, including a multidimensional freight and logistics industry performance reference set comprising multiple key assessment performance reference tables, at least one key assessment performance reference table defining a customer interaction platform including:

a 'Basic' performance level specifying 'Basic' performance assessment criteria;

a 'Competitive' performance level specifying 'Competitive' performance assessment criteria;

a 'Market Leading' performance level specifying 'Market Leading' performance assessment criteria;

establishing pricing assessment criteria, wherein the 'Basic' performance assessment criteria includes a first criteria for Flexibility where basic and additional surcharges can have no interdependencies between them;

wherein the 'Competitive' performance assessment criteria includes a first criteria for Flexibility where through multi stage pricing conditional pricing rules can be defined taking interdependencies between services into account; wherein the 'Market Leading' performance assessment criteria includes a first criteria for Flexibility where support for multiple tariff structures with different inputs within one contract, pricing based on pallets, items or bulk volume;

receiving, by the processor, an input specifying a freight and logistics industry area and a freight and logistics industry key assessment area with the freight and logistics industry area for analysis;

searching, by the processor, the multidimensional freight and logistics industry performance reference set for a matching key assessment performance reference table that matches the freight and logistics industry area and the freight and logistics industry key assessment area;

retrieving, by the processor, the matching key assessment performance reference table;

initiating, by the processor, analysis of the matching key assessment performance reference table; and obtaining, by the processor, a resultant performance level for the freight and logistics industry key assessment area.

9. A computer-readable memory or data storage means encoded with data representing a computer program for a high-performance capability assessment of a freight and logistics business, the computer-readable memory or data storage means causing the computer to perform the acts of:

providing a processor operatively coupled to a communication network;

providing one or more databases operatively coupled to the processor and accessible through the communication network;

coupling an interface to the processor for receiving input;

establishing a machine-readable memory in said one or more databases, including a multidimensional freight and logistics industry performance reference set comprising multiple key assessment performance reference tables, at least one key assessment performance reference table defining a customer interaction platform including:

a 'Basic' performance level specifying 'Basic' performance assessment criteria;

a 'Competitive' performance level specifying 'Competitive' performance assessment criteria;

a 'Market Leading' performance level specifying 'Market Leading' performance assessment criteria;

establishing product management assessment criteria, wherein the 'Basic' performance assessment criteria includes a first criteria for Organization and Methods where no dedicated organization for product management exists;

wherein the 'Competitive' performance assessment criteria includes a first criteria for Organization and Methods where a product management organization has been defined;

wherein the 'Market Leading' performance assessment criteria includes a first criteria for Organization and Methods where product management methodology is available and trained consistently;

receiving, by the processor, an input specifying a freight and logistics industry area and a freight and logistics industry key assessment area with the freight and logistics industry area for analysis;

searching, by the processor, the multidimensional freight and logistics industry performance reference set for a matching key assessment performance reference table that matches the freight and logistics industry area and the freight and logistics industry key assessment area;

retrieving, by the processor, the matching key assessment performance reference table;

initiating, by the processor, analysis of the matching key assessment performance reference table; and obtaining, by the processor, a resultant performance level for the freight and logistics industry key assessment area.

10. The computer-readable medium of claim 7 further comprising computer-readable content to cause a computer to perform acts of establishing sales assessment criteria, wherein the 'Basic' performance assessment criteria includes a first criteria for Sales planning where planning is done stand-alone without being aligned with other capabilities.

11. The computer-readable medium of claim 7 further comprising computer-readable content to cause a computer to perform acts of establishing invoicing assessment criteria, wherein the 'Basic' performance assessment criteria includes a first criteria for Invoice Distribution based on paper based invoices.

12. A system for high-performance capability assessment of a freight and logistics business, comprising:
   a processor operatively coupled to a communication network;
   an interface coupled to the processor configured to receive input; one or more databases operatively coupled to the processor and accessible through the communication network;
   a machine-readable memory operatively located in said one or more databases, said memory including a multi-dimensional freight and logistics industry performance reference set comprising multiple key assessment performance reference tables, at least one key assessment performance reference table defining a customer interaction platform including:
   a 'Basic' performance level specifying 'Basic' performance assessment criteria;
   a 'Competitive' performance level specifying 'Competitive' performance assessment criteria;
   a 'Market Leading' performance level specifying 'Market Leading' performance assessment criteria;
   the processor establishing a customer service assessment criteria, wherein the 'Basic' performance assessment criteria includes a first criteria for Customer Relationship Management (CRM) where customer satisfaction only polled on ad-hoc basis;
   wherein the 'Competitive' performance assessment criteria includes a first criteria for CRM where regular surveys sent to customers with improvement suggestions; and
   wherein the 'Market Leading' performance assessment criteria includes a first criteria for CRM where customer satisfaction is closely monitored and relationship management procedures are defined;
   the interface receiving an input specifying a freight and logistics industry area and a freight and logistics industry key assessment area with the freight and logistics industry area for analysis;
   wherein the processor searches the multidimensional freight and logistics industry performance reference set for a matching key assessment performance reference table that matches the freight and logistics industry area and the freight and logistics industry key assessment area, and retrieves the matching key assessment performance reference table; and
   wherein the processor performs analysis of the matching key assessment performance reference table and obtains a resultant performance level for the freight and logistics industry key assessment area.

13. A system for high-performance capability assessment of a freight and logistics business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multi-dimensional freight and logistics industry performance reference set comprising multiple key assessment performance reference tables, at least one key assessment performance reference table defining a customer interaction platform including:
   a 'Basic' performance level specifying 'Basic' performance assessment criteria;
   a 'Competitive' performance level specifying 'Competitive' performance assessment criteria;
   a 'Market Leading' performance level specifying 'Market Leading' performance assessment criteria;
   the processor establishing pricing assessment criteria,
   wherein the 'Basic' performance assessment criteria includes a first criteria for Flexibility where basic and additional surcharges can have no interdependencies between them;
   wherein the 'Competitive' performance assessment criteria includes a first criteria for Flexibility where through multi stage pricing conditional pricing rules can be defined taking interdependencies between services into account;
   wherein the 'Market Leading' performance assessment criteria includes a first criteria for Flexibility where support for multiple tariff structures with different inputs within one contract, pricing based on pallets, items or bulk volume;
   the interface receiving an input specifying a freight and logistics industry area and a freight and logistics industry key assessment area with the freight and logistics industry area for analysis;
   wherein the processor searches the multidimensional freight and logistics industry performance reference set for a matching key assessment performance reference table that matches the freight and logistics industry area and the freight and logistics industry key assessment area, and retrieves the matching key assessment performance reference table; and
   wherein the processor performs analysis of the matching key assessment performance reference table, and obtains a resultant performance level for the freight and logistics industry key assessment area.

14. A system for high-performance capability assessment of a freight and logistics business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multi-dimensional freight and logistics industry performance reference set comprising multiple key assessment performance reference tables, at least one key assessment performance reference table defining a customer interaction platform including:
   a 'Basic' performance level specifying 'Basic' performance assessment criteria;
   a 'Competitive' performance level specifying 'Competitive' performance assessment criteria;
   a 'Market Leading' performance level specifying 'Market Leading' performance assessment criteria;
   the processor establishing product management assessment criteria, wherein the 'Basic' performance assessment criteria includes a first criteria for Organization and Methods where no dedicated organization for product management exists;

wherein the 'Competitive' performance assessment criteria includes a first criteria for Organization and Methods where product management organization has been defined;

wherein the 'Market Leading' performance assessment criteria includes a first criteria for Organization and Methods where product management methodology is available and trained consistently;

the interface receiving an input specifying a freight and logistics industry area and a freight and logistics industry key assessment area with the freight and logistics industry area for analysis;

wherein the processor searches the multidimensional freight and logistics industry performance reference set for a matching key assessment performance reference table that matches the freight and logistics industry area and the freight and logistics industry key assessment area, and retrieves the matching key assessment performance reference table; and wherein the processor performs analysis of the matching key assessment performance reference table, and obtains a resultant performance level for the freight and logistics industry key assessment area.

15. The system of claim 12, wherein the processor establishes sales assessment criteria, wherein the 'Basic' performance assessment criteria includes a first criteria for Sales planning: where planning is done stand-alone without being aligned with other capabilities.

16. The system of claim 12, wherein the processor establishes invoicing assessment criteria, wherein the 'Basic' performance assessment criteria includes a first criteria for Invoice Distribution based on paper based invoices.

17. The system of claim 12, wherein the processor establishes booking and ordering management assessment criteria, wherein the 'Basic' performance assessment criteria includes a first criteria for Data Entry Performance where mostly manual order data entry is performed into local systems.

* * * * *